Durand & Pecqueur.
Making Accouterments,
No. Reissue 100 Reissued Aug. 7, 1847
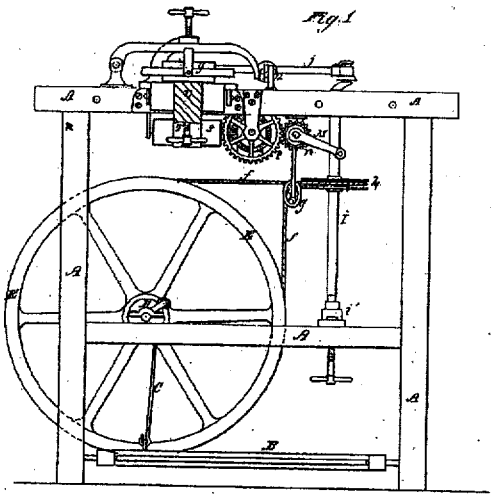
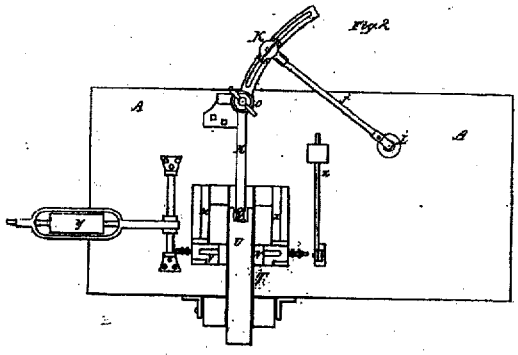
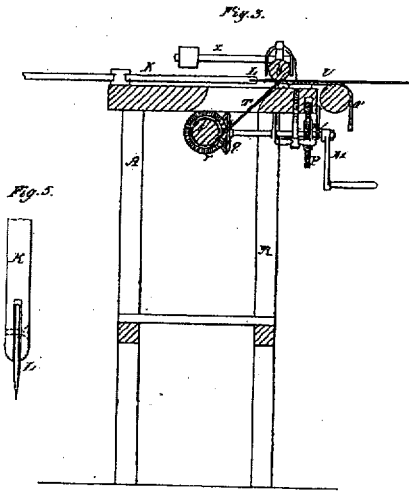
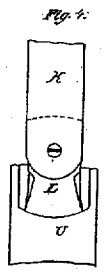
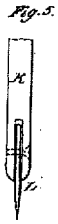
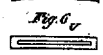
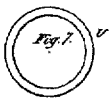
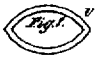

UNITED STATES PATENT OFFICE.

FRANCOIS DURAND AND ONESIPHORE PECQUEUR, OF PARIS, FRANCE.

IMPROVEMENT IN MAKING SCABBARDS AND OTHER HOLLOW ARTICLES OF LEATHER.

Specification forming part of Letters Patent No. 4,986, dated October 15, 1846; Reissue No. 100, dated August 7, 1847.

*To all whom it may concern:*

Be it known that we, FRANCOIS DURAND and ONESIPHORE PECQUEUR, citizens of France, residing in the city of Paris, in the Kingdom of France, have invented a new and useful improvement in the manufacture of various articles which are made of leather; and we do hereby declare that the following is a full and exact description thereof.

Our new manufacture of articles made of leather includes all or nearly all of those which are usually made of that material, and which have been heretofore manufactured by sewing, gluing, or otherwise cementing the edges of leather together, so as to form hollow articles—such, for example, as scabbards or sheaths for swords and other cutting-instruments, cases for fire-arms, cartouch-boxes, covers for the rollers of spinning-machines, hose for the conveyance of fluids, and, in fine, of all or nearly all of the hollow articles which may be made of leather.

The machinery or apparatus by which this may be effected may be variously modified; but to enable others to carry our invention into practical operation we will describe a machine which we ourselves have used in the manufacture, and with which the specimens which we have deposited in the Patent Office were made.

Before applying the leather to the machine or instrument by which it is to be operated on we cut it into strips of such width or into such shape as may be required in forming the particular article wanted, selecting such leather as shall be equal in thickness to the two sides of the tube, case, or other article that is to be manufactured, this being necessary, as the process of manufacturing consists in the splitting of the leather so as to form two laminæ, leaving in all cases such portion of the edges of the leather uncut as shall be at least equal to the thickness of the article to be formed. Thus, supposing, for example, that we wish to form a tube or hose which is to be of equal diameter in every part, we cut the leather into a strip of equal width throughout and of such length as may be determined on, and, beginning at one end, we slit it from side to side nearly, leaving, say, an eighth of an inch (more or less) on each side uncut.

In the forming of a hose or other tube which is to be open at both ends, it may, after operating on it for one-half of its length, be reversed and cut from the other end, and by this means a double length of leather may be operated on.

In the accompanying drawings, Figure 1 is a side elevation of the above-named machine; Fig. 2, a top view or plan of it, and Fig. 3 a transverse vertical section thereof.

In each of these figures where the same parts are represented they are designated by the same letters of reference.

A A is the frame of the machine, which may be of wood or metal.

E is a band-wheel, which may be turned by any adequate power. This in Fig. 1 is represented as being furnished with a treadle, B, and a pitman, C, operating on a crank, D, in the manner of the band-wheel of the ordinary turning-lathe.

*f f* is the band which passes around the band-wheel E and the pulley or whirl *h*, and is thereby made to drive the vertical spindle I, a pulley, *g*, serving to guide said band around the grooved whirl *h* on said spindle. *i'* is its step, and at its opposite end it runs in a collar in the frame A.

F is a crank on the upper end of said shaft, which crank vibrates the connecting-rod J. The outer end of this rod is connected to the lever K K', Fig. 2, to which it gives a vibratory motion from the action of the crank F. In the curved end K of said lever there is a slot, *a a*, by means of which and of the sliding piece J', which carries the joint-pin of the connecting-rod J, said rod may be shifted to different points of the lever, so as to increase or decrease its vibration.

O is the fulcrum of said lever, and at the extreme end of its arm K it carries a knife or cutter, L, by which the leather is to be slit or divided. This knife is shown of an enlarged size at Figs. 4 and 5, the former being a top and the latter a side view thereof.

U represents a strip of leather that is to be converted into a hose or tube, and this is to be passed up against the vibrating knife L, which may be done in the following manner:

In Fig. 3 S is a roller around which a strip of leather, T, may be wound by turning the winch M, which may be done by hand. The shaft of this winch is represented as carrying a pinion, *n*, that gears into a toothed wheel, *p*, the shaft of which toothed wheel carries the bevel-wheel *q*, that gears into a like wheel, *r*, on the shaft of the roller S. This roller may, however, be made to turn in various other ways.

The strip T may be denominated the "carrier-strip," as that, V, which is to be cut, rests upon it, and is made to move up against the knife by the adhesion of one to the other. The strip T rests on a bed-piece, *x*, which may be raised or lowered by the screw *x'*. A pressing-roller, *y*, is made to bear upon the strip U as it advances toward the knife. This roller has its pivots running in a frame, *m m*, that may be turned out of the way at pleasure, as shown in Fig. 2. The roller *y* is borne down on the leather by means of a lever, *z*, carrying a weight, *z'*, that bears on the end *m'* of the frame *m*. Guide-pieces *v v*, Fig. 2, which may be shifted at pleasure, serve to bear against the edges of the strip U as it is carried toward the knife, and prevent its deviating from its proper position.

Figs. 6, 7, and 8 represent three forms of tube or sheath that may be produced from straight strips of leather, said forms depending upon the mold upon which the leather is passed after completing the cutting process.

It will be manifest that by shifting the place of the slide J' on the arm K of the lever the knife may be made to vibrate to a greater or less distance at pleasure, and that the leather may be thereby slit so as to form articles of various forms—such, for example, as that of flasks, bottles, and other bellied vessels—and such we have actually formed by its means; and where large numbers of such articles were required the shifting movement may be automatically effected in modes that the skillful machinist will readily devise, and which must be varied according to the end in view. In many cases—such as the forming of pouches, cartouch-boxes, &c.—the leather will not be cut entirely through, an uncut portion being left where the bottom or other termination is to be formed, in the same way in which it is left uncut at the sides when a tube is to be formed. The leather as it is split passes over the edges of the knife, and onto the arm K' of the lever, the length of which should, therefore, be proportioned to the nature of the article that is being made.

The leather which is to be cut is to be first soaked in water, and when cut it is to be passed onto the mold or former by which its shape is to be ultimately determined, and it is then in a proper situation to be rendered waterproof, colored, varnished, or otherwise finished, according to the purpose for which it is intended.

Having thus fully described the nature and object of our invention, and distinctly pointed out the manner in which the same may be carried into operation, and having also described one form of machinery which may be used in the manufacturing of various articles upon our plan, we do hereby declare that we do not now claim the manner of constructing this particular machine, but that the same has been herein described for the express purpose of showing to the workman a practical mode of procedure in effecting such manufacture; but

What we do claim, and desire to secure by Letters Patent, is—

The within-described manner of making articles of leather such as are herein designated—that is to say, the making them without seams or joinings, either by cement or otherwise, the leather of which they are made being split, so as to leave solid edges, as described, and this we claim irrespective of any particular machine or apparatus by which the splitting of the leather may be effected.

DURAND.
PECQUEUR.

Witnesses:
JOHN BARTLY,
DÉROUR.